Feb. 25, 1958 J. P. JONES 2,825,047

MAGNETIC CORE CURRENT DRIVER

Filed Nov. 1, 1955 2 Sheets-Sheet 1

INVENTOR.
JOHN PAUL JONES

BY George Barn

ATTORNEY

MAGNETIC CORE CURRENT DRIVER

Filed Nov. 1, 1955 2 Sheets-Sheet 2

INVENTOR.
JOHN PAUL JONES
BY George Barnes
ATTORNEY

United States Patent Office 2,825,047
Patented Feb. 25, 1958

2,825,047

MAGNETIC CORE CURRENT DRIVER

John Paul Jones, Pottstown, Pa., assignor to Burroughs Corporation, Detroit, Mich., a corporation of Michigan Application November 1, 1955, Serial No. 544,190
6 Claims. (Cl. 340—174)

This invention relates to magnetic memory circuits and apparatus using static magnetic binary storage elements. More particularly, though not necessarily, it relates to magnetic shift registers employing such static magnetic binary storage elements, and to driving circuits for such shift registers.

Electronic computing systems may employ magnetic shift registers advantageously for the storage and manipulation of binary information. One type of magnetic shift register, as used in such systems, is described in an article entitled "Static magnetic storage and delay line," by An Wang and Way Dong Woo, published in the Journal of Applied Physics, January 1950.

A static magnetic core used in this type of magnetic shift register circuit has a rectangular hysteresis characteristic and therefore is capable of being magnetized to saturation in either of two directions. After such magnetic saturation, a remanent flux remains in the core of the polarity to which the core was saturated. Two remanent states, therefore, are provided which are used to store corresponding binary information. The information stored in a core may be sensed by applying a saturating magnetic field of one predetermined polarity. If the core is in the remanence polarity of the saturating field, only a small noise voltage will be induced in the windings about the core. However, if the core is in the remanence state opposite to the saturating field, the storage state will switch and cause a high output voltage to be induced in the windings. Thus, the state in which the direction of remanence is opposite to that which would result from the application of a sensing or shift pulse to a shift winding on the core may be called an active state, and conversely the state in which the direction of remanence is the same as that which would result from the application of a sensing pulse is called an inactive state. When a sensing flux is applied to a core in the active state, the inactive state is thereby caused to appear. However, when the sensing flux is applied to a core already in the inactive state, no change is caused in the storage state. The smaller output voltage induced during the latter sensing operation may be termed noise, since it gives an indication similar to the larger voltage caused during a change of the storage state, and is therefore undesirable.

In digital notation, a core in the active state may be referred to as storing a binary digit "one," and a core in the inactive state may be referred to as storing the digit "zero." A single piece of stored binary information of either polarity may be termed as a bit. Each core can store only one binary digit at any one time, and by action of the shift pulse, the core is reset in the "zero" condition, which enables it to receive a bit of binary input information.

Prior art magnetic shift registers have used three windings on each magnetic core. One of these windings is used to receive information transmitted from preceding circuits, a second winding is used to transmit the information to following circuits such as another magnetic storage element, and the third winding, sometimes referred to as the advance winding, is used as the shift or sensing winding through which current pulses are passed to shift information out of the transformer core and return it to the inactive state.

In general, generators employed to advance the information along the array of cores of a shift register supplied rectangular or substantially square wave current pulses to the advance windings associated with such array of cores. It was found that such sharp pulses tended to shock the cores so that the readout of a "zero," instead of resulting in a negligible noise signal in the output circuit of the core being read out, would cause a signal of such high amplitude to appear in the output circuit that a spurious "one" would be transferred to an adjacent core. It was discovered that one could, by rounding off the leading edges of the current pulses that were applied to the advance windings of a magnetic core shift register, avoid the spurious transfer enumerated above. A patent application by Lyle G. Thompson, Serial No. 426,350, entitled "Magnetic Shift Register," and filed on April 29, 1954, and assigned to the assignee of the instant invention, sets out circuitry for increasing the rise times of the leading or forward edges of the current pulses that are to be applied to the advancing windings of a conventional shift register.

The present inventor discovered that spurious "ones" are read into cores by the very advance windings that are adapted to clear such cores and return them to their "zero" states. Since an advance winding will consist of a series of inductive windings, each associated with a magnetic core, and since each inductive winding has inherent capacity, such inherent capacity, added to other capacity existing in the advance windings circuit, will in effect make the advance windings an L.-C. circuit. Such an L.-C. circuit will produce oscillations when "shocked" by a high frequency pulse which has a sharp trailing edge. Such oscillations will create undesirable ringing in the advance windings. These oscillations may, and do, cause current to flow through the advance windings in a direction opposite to that flow of current which switches the magnetic cores associated with such windings to their "zero" states. Consequently spurious "ones" will be read into magnetic cores by high frequency oscillations produced by rectangular pulses that initiate current pulses in the advance windings during the clearing of the cores.

It is often desirable to make shift registers of 30 to 40 bits and higher, driven from a single driver. This effect is cumulative and is especially disastrous in long registers. In the prior art such long registers would not function properly.

It was my discovery that one can, by utilizing a current pulse having a trailing edge with a slow fall-time, minimize the generation of such unwanted oscillations. The cores will have been switched to their "zero" states by the time that the advancing pulse is falling back to its minimum current level, and if this fall-time to the minimum level is too sharp, oscillations are produced in the L.-C. ringing circuit, such oscillations tending to read spurious "ones" into the information storage cores. By supplying circuitry for increasing the fall-time of the trailing edge of the advancing pulse the generation of noise pulses during the clearing of the information storing cores of a shift register is avoided.

Consequently, it is an object of the present invention to obtain a more reliable magnetic core shift register.

It is a further object to prevent the read-in of spurious "ones" in a magnetic shift register.

Still another object is to obtain means for modifying the trailing edges of advancing shift pulses yet retain the means for modifying the leading edges of such advancing pulses, such modification being made separately or substantially simultaneously.

A still further object of this invention is to improve the operating stability of magnetic memory devices such as magnetic binary shift registers.

The invention will now be described with reference to the drawings of which:

It is to be understood in the explanation to follow that in accordance with the convention employed in the above noted article in the January 1950 "Journal of Applied Physics," a bistable magnetic core is in its "one" state when it is in its positive remanent state and in its "zero" state when it is in the negative remanent state of its B-H hysteresis loop. Consequently when a core is cleared of its information or switched from its "one" state to its "zero" state, a negative field is required to cause the core to traverse its hysteresis loop from its positive remanent state to its negative remanent state. Thus when the present specification refers to a rounded trailing edge for the current pulse that is applied to the advance winding, it applies to either direction of current flow in the advance winding. The orientation of the winding wound about a core will determine the flux polarity.

Figure 1:
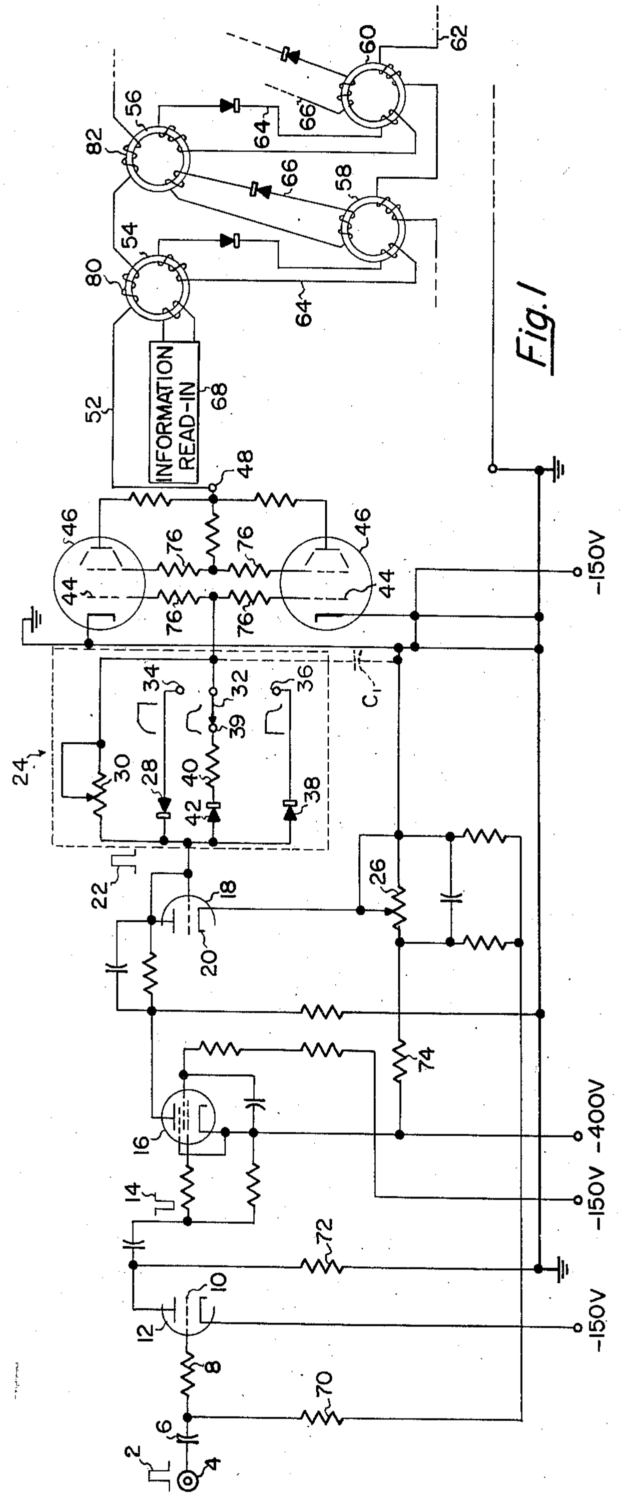
Figure 1 is a circuit schematic of the current pulse driver and pulse shaping means in combination with the cores and associated windings of a conventional two core per bit shift register.

Referring now to Figure 1 of the drawings, a positive pulse 2 enters input terminal 4 and traverses capacitor 6 and series grid limiting resistor 8, causing grid 10 of amplifying tube 12 to swing from cut-off to zero bias. Tube 12 conducts and an inverted amplified pulse 14 appears at the grid of amplifier tube 16. Amplifier tube 16 inverts and amplifies the pulse 14. The resulting positive pulse is amplitude limited by the clamping diode 18 (which may be a half of a duo-triode tube having grid and plate connected together) and appears as a substantially rectangular pulse 22 at the input of pulse shaping network 24. Potentiometer 26 varies the point of amplitude clipping carried out by diode 18 from about —70 volts cut-off to about 0 volts grid bias.

Since the substantially rectangular current pulse 22 is the type that will cause transfer of spurious "one" from one core to another if its leading edge has a very rapid rise time, or L-C ringing in the advance windings if its trailing edge has a very rapid fall time, pulse shaping network 24 is utilized to modify such rise and fall times. Diode 28 and potentiometer 30 form one pulse shaping circuit of the shaping network 24. When switch arm 32 is turned to contact terminal 34, the diode 28 is switched in parallel with the potentiometer 30. In this position the diode polarity is such that it will conduct on negative going voltage excursions and not conduct on positive going excursions. Therefore, the grid capacities $C_1$ of the output tubes 46 must charge through the resistance 30 only on positive going voltage excursions, and through the forward conductive resistance of the diode and the resistor 30 on negative going excursions. Since the diode forward resistance is comparatively small the discharge of $C_1$ is very fast, and the trailing edge of the pulse is substantially unaffected.

When the switch arm 32 is turned to contact 36, a diode of opposite polarity is switched in parallel with the resistor 30 and the conditions are just the opposite from switch position 34. The grid capacities $C_1$ must now discharge through the resistance 30 only, and charge through the diode 38 in parallel with resistance 30. In this position the RC charge time of $C_1$ and the forward resistance of the diode is very fast, and the pulse rise time remains unaffected.

When the switch arm 32 makes contact with terminal 39 the capacity $C_1$ must charge and discharge through the resistance 30, since the resistor 40 is of a comparatively high value. In this case, both the rise and fall times are affected simultaneously by the adjustment of potentiometer 30. The network comprising the diode 42 and resistor 40 is only a corrective one. The resistive adjustment 30, would by itself, have a greater affect upon the rise time than the fall time. Within the operating range of the control, the diode 42 and resistor 40 tend to equalize the effect of resistor 30 adjustments. In this manner both the trailing and leading edges are modified by the pulse shaping network 24. The shaped output current pulse is applied to the grids 44 of driver tubes 46 and such current pulse is amplified and inverted to appear at the input terminal 48 of advance winding bus 52. Magnetic cores 54 and 56 are two cores that are part of an array of cores that are switched to their "zero" states by current pulses appearing in advance winding bus 52, whereas cores 58 and 60 are two cores of an array of cores that are returned to their "zero" states by current pulses appearing in another advance winding bus 62, driven by another pulse generator similar to embodiment shown herein. Transfer loops 64 and 66 and signal source 68 for feeding information into the first core 56 of the conventional shift register are shown, but no detailed description of their operation is presented since such means are well known in the magnetic shift register field. The array of cores 58, 60, etc. stores the information that has been read out of cores 54, 56, etc. due to the action of a shaped shifting pulse in advance winding 52. The next shaped shifting pulse will come from the other pulse generator, not shown, and pass through advance winding bus 62 to read out information stored in cores 58, 60, etc. Transfer loops 66 are schematic representations of means for returning information stored in the second array of cores 58, etc. back to the first array of cores 56, etc.

Resistors 70 and 72 are respectively the grid resistor and plate load resistor of amplifier tube 12. Resistor 74 is a voltage dropping resistor to obtain the necessary cut-off voltage for diode 18 from the —150 volt terminal and to supply cut-off bias to tube 12. Resistors 76 are conventional grid limiting resistors employed in the grid circuit of power amplifier tubes to avoid the generation of parasitic oscillations in the amplifier tube circuit. The remaining resistors and capacitors shown in the drawings but not described in the specifications are routine engineering design features that are not essential features of the instant invention.

Figure 3:
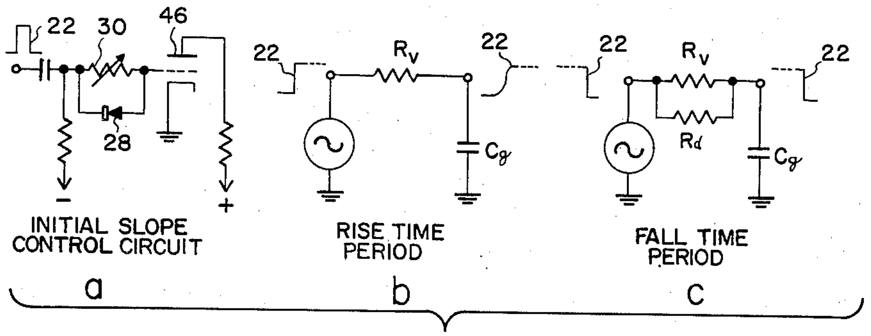
Figure 3 is a schematic circuit diagram for modifying the slope of the leading edge of the driving current pulse and equivalent circuits therefor.
Figure 4:
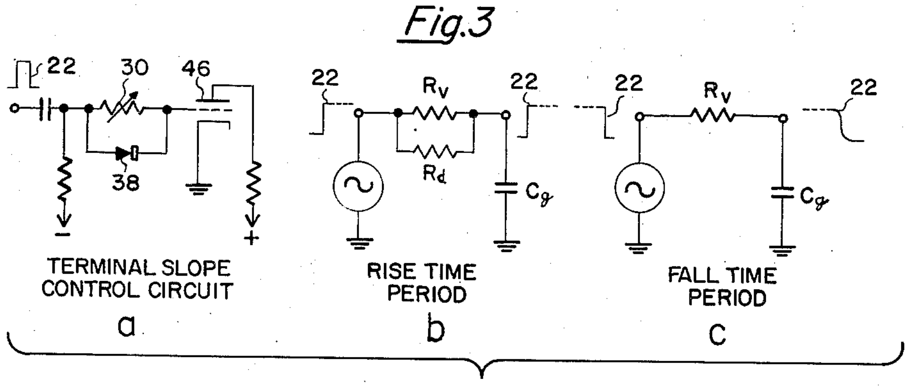
Figure 4 is a schematic circuit diagram for modifying the slope of the trailing edge of the driving current pulse and equivalent circuits therefor.
Figure 5:
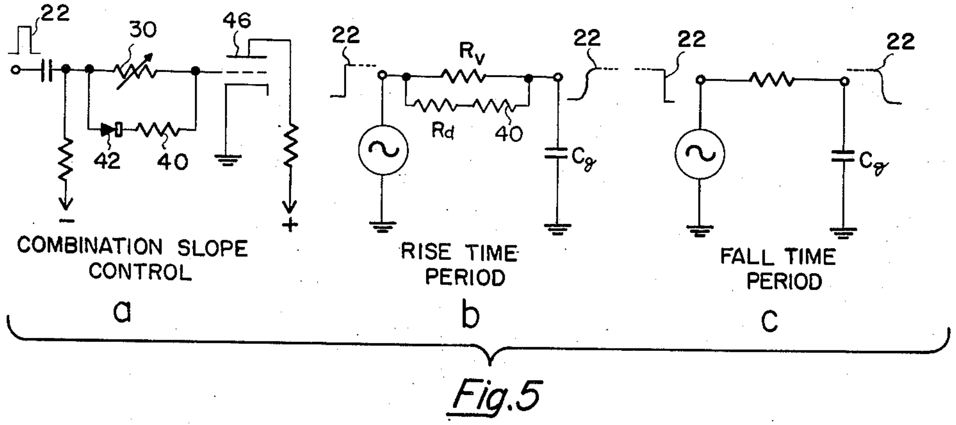
Figure 5 is a schematic diagram for modifying both the leading and trailing edges of the driving current pulse and the equivalent circuits therefor.

Referring now to Figure 3 of the drawings, there is shown a circuit (Figure 3*a*) which operates to modify the rise time period of current pulse 22, but not the fall time period. The equivalent circuit for the rise time period is shown in Figure 3*b* whereas the equivalent fall time period is represented by Figure 3*c*. The shift current pulse 22 is capacity coupled to potentiometer 30 and, as is shown in Figures 1 and 3*a*, the diode 28 polarity is such as to be non-conducting during the pulse rise time period and conducting during the fall time period. During the rise time period the diode 28 is non-conducting, charging the grid capacity of power amplifier tube 46 (only one tube being shown) through the series resistance or potentiometer 30. The grid voltage builds up exponentially. In Figures 3*b* and 3*c*, $R_v$ is the potentiometer resistance in the pulse shaping network, $R_d$ is the diode forward resistance, and $C_g$ is the grid capacity of the power amplifier tube 46. The leading edge of the current pulse 22 is shown in its modified form in the output circuit of the pulse shaping network, substantially no modification taking place in the trailing edge of the current pulse 22.

The fall time control circuit of Figure *4a* is substantially the same as the rise time control except that the diode 38 has a polarity opposite to that of diode 28. The forward resistance $R_d$ of the diode 38 will now be in parallel with potentiometer 30 during the rise time period of the current pulse 22 but effectively out of time control circuit during the fall time period. As a consequence the trailing edge of current pulse 22 is modified as shown in Figure *4c*.

In Figure *5a*, another resistor 40 is placed in parallel with potentiometer 30 and in series with diode 42. The diode conducts on rise time only and, in conjunction with resistor (40), helps to equalize the charge and discharge times of ($C_1$).

It is noted that if especially long rise times are desired, it may be necessary to add a capacitor to the tube input capacity $C_g$ in order to keep resistor 30 low enough for stable operation. But this precaution is often not necessary since the input capacity is ordinarily kept low as possible to reduce the amount of power required to drive the power amplifier.

Figure 2:
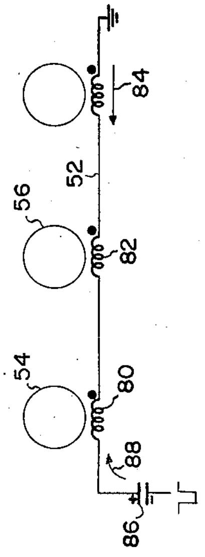
Figure 2 is a circuit schematic of a portion of the advance winding circuit.

In Figure 2, there is shown the advance winding system of Figure 1 in more detail. Cores 54, 56, etc. are coupled to windings 80, 82, etc. in such a manner that a current pulse flowing in the direction of the arrow 84 will cause cores 54, 56, etc. to be shifted to their "zero" states. Capacitor 86 represents the lumped capacity C in the advance winding circuit. Let L represent the lumped inductance of all the windings in the advance winding circuit. Assume that cores 54, 56, etc. are being cleared to their "zero" states by a substantially rectangular current pulse flowing through advance winding bus 52. When the substantially rectangular current pulse terminates the sharp transient will create LC ringing or high frequency oscillations in the circuit comprising the lumped capacitor and lumped inductance. Consequently, once cores 54, 56, etc. have been cleared and are in their respective "zero" states, the charge which has accumulated on the lumped capacitor 86 will, as a result of oscillations initiated by the sharp slope of the trailing edge of the advancing pulse, traverse the advanced winding bus 52 in a direction opposite to that shown in Figure 2. Such reversed current flow, as represented by arrow 88, will tend to read a spurious "one" into some of the cleared cores. It is this type of spurious read-in that is overcome by rounding the trailing edges of the advancing current pulses.

The above described invention not only affords means for obtaining rounded trailing edges for clearing the information stored in the bistable cores of a magnetic shift register, but by utilizing a novel means for decreasing either the rise time as well as the fall time, or both, of a rectangular pulse, a compact and versatile pulse generator for a magnetic shift register is obtained. It was shown in the above referred to patent application Serial No. 426,350 of Lyle G. Thompson that rounded leading edges are desirable as shift pulses in a magnetic shift register. My discovery has taught the advantages of utilizing rounded trailing edges for such shift pulses. The instant pulse generator employs means for attaining both types of wave shaping, permitting one to readily adapt the instant invention for driving magnetic cores with a substantial diminution and attenuation of noise pulses in the transfer loops and shift windings of a magnetic shift register.

What is claimed is:

1. In a magnetic shift register including an array of bistable magnetic cores, means for reading "ones" into said bistable cores, a common shift winding coupled to said cores, and means for applying shift current pulses to said common shift winding so as to return said cores to their respective "zero" states comprising a source of substantially rectangular pulses, plural circuit means for first said rectangular pulses including a modifying circuit for modifying only the leading edge of said rectangular pulses, a second circuit for modifying only the trailing edge of said rectangular pulses, and a third circuit for modifying both the trailing and leading edges of said rectangular pulses during a single pulse interval, and switch means in the output circuit of said plural circuit means for coupling any one of said pulse modifying circuits to said common shift winding.

2. A system for applying modified rectangular pulses to the shift winding of a magnetic core shift register the cores of which are capable of assuming either of two stable states of magnetic remanence, said system comprising a source of substantially rectangular pulses, a network for rounding off the edges of said rectangular pulses connected to the output of said source, said network comprising a variable impedance device, a first unidirectional current flow member in parallel with said variable impedance device, a second unidirectional current flow member in parallel with both said variable impedance device and with said first unidirectional current flow member, said second member being polarized oppositely to said first unidirectional current flow member, a third unidirectional current flow member in series with a resistive element, the latter two being also in parallel with said variable impedance device, and with said first and second unidirectional current flow members, and switch means in the output of said network for coupling any one of said parallel circuits to said shift winding.

3. In a magnetic shift register including an array of bistable magnetic cores, means for reading "ones" into said bistable cores, a common shift winding coupled to said cores, and means for applying shift current pulses to said common shift winding so as to return said cores to their respective "zero" states comprising plural circuit means for modifying either or both leading and trailing edges of said rectangular pulses, and a switch coupled to the output of said plurality circuit means for coupling any of the pulse modifying circuits to said shift winding.

4. In a magnetic shift register including an array of bistable magnetic cores, a common shift winding for said array, a source of substantially rectangular pulses, and means for rounding said rectangular pulses connected between said source and said common shift windings, said means comprising a network of parallel electrical branches, a primary branch consisting of an impedance element, a second branch consisting of a diode, a third branch consisting of a diode oppositely polarized to that of the first diode, and a fourth branch consisting of a diode and an impedance element, switch means for connecting the primary branch with any of said other branches, and means for reactively coupling said switch means to said shift winding.

5. In combination; an array of magnetic cores each capable of assuming either of two stable states of magnetic remanence; switching sindings on said cores; a source of substantially rectangular pulses; and means, including a network adapted to decrease the slopes of both the leading and trailing edges of rectangular pulses, connecting said source to the switching windings of at least some of said cores, said network comprising parallel branch paths one of which paths comprises a first resistance and another of which paths comprises an asymmetrical conducting device in series with a second resistance, said second resistance being of high value relative to said first resistance, said asymmetrical conducting device being poled to present relatively low impedance to the leading edge of said pulse and relatively high impedance to the trailing edge of said pulse.

6. In combination; a array of magnetic cores each capable of assuming either of two stable states of magnetic remanence; switching windings on said cores; a source of substantially rectangular pulses; and means, including a network for decreasing the slope of the trailing edge of rectangular pulses, connecting said source to the switching windings of at least some of said cores, said network comprising branch paths one of which comprises a first resistance and another of which comprises an asymmetrical conducting device, said asymmetrical conducting device being poled to present relatively low impedance to the leading edge of said pulse and relatively high impedance to the trailing edge of said pulse.

References Cited in the file of this patent

UNITED STATES PATENTS

| | | |
|---|---|---|
| 2,654.080 | Browne | Sept. 29, 1953 |
| 2,678,965 | Ziffer et al. | May 18, 1954 |
| 2,729,808 | Auerbach et al. | Jan. 3, 1956 |
| 2,730,695 | Ziffer | Jan. 10, 1956 |

U. S. DEPARTMENT OF COMMERCE

PATENT OFFICE

CERTIFICATE OF CORRECTION

Patent No. 2,825,047 February 25, 1958

John Paul Jones

It is hereby certified that error appears in the printed specification of the above numbered patent requiring correction and that the said Letters Patent should read as corrected below.

Column 5, line 75, for "first" read --modifying--; column 6, line 1, for "modifying" read --first--; line 38, for "plurality" read --plural--; line 57, for "sindings" read --windings--.

Signed and sealed this 6th day of May 1958.

(SEAL)

Attest:

KARL H. AXLINE

Attesting Officer

ROBERT C. WATSON

Commissioner of Patents